April 22, 1924.
R. DUROSSETTE
TIRE PATCH
Filed Jan. 17, 1923
1,491,136
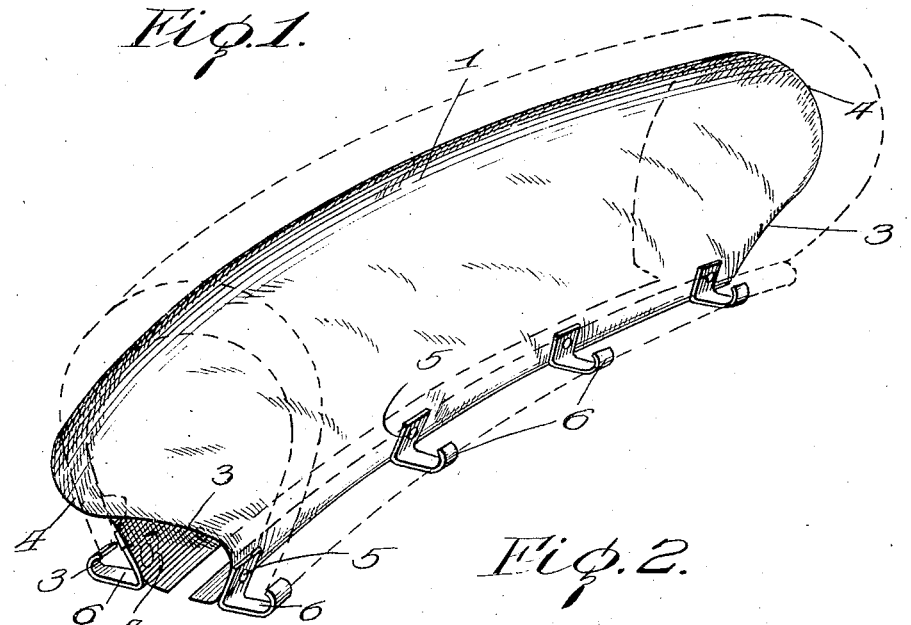
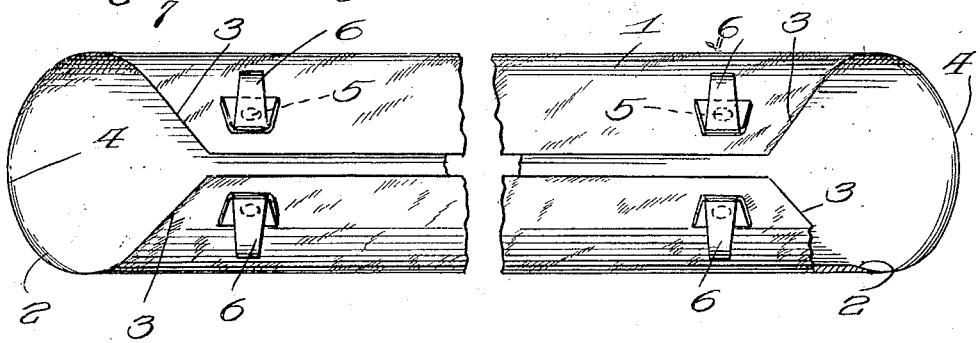
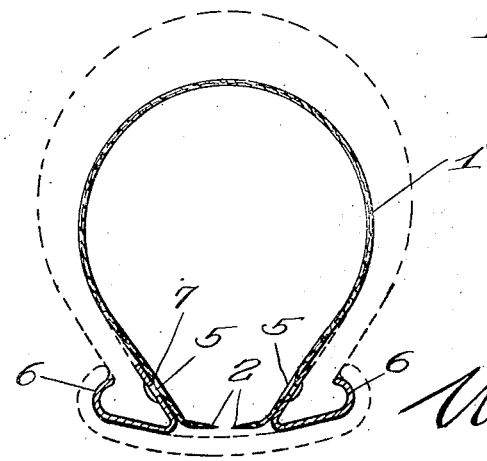
Inventor
Roy Durossette
Watson E. Coleman
Attorney Patented Apr. 22, 1924.

1,491,136

UNITED STATES PATENT OFFICE.

ROY DUROSSETTE, OF RICHARDS, MISSOURI.

TIRE PATCH.

Application filed January 17, 1923. Serial No. 613,168.

*To all whom it may concern:*

Be it known that I, ROY DUROSSETTE, a citizen of the United States, residing at Richards, in the county of Vernon and State of Missouri, have invented certain new and useful Improvements in Tire Patches, of which the following is a specification, reference being had to the accompanying drawings.

This invention relates to certain improvements in tire patches and has relation more particularly to a device of this general character which is adapted to be inserted between the outer casing and inner tube and it is an object of the invention to provide a novel and improved device of this general character having its opposite end portions loose, when the patch is applied, whereby the inflation of the inner tube serves to press said end portions of the patch against the casing to protect the tube from damage.

Another object of the invention is to provide a novel and improved patch of this general character which is adapted for use in connection with a puncture, cut or the like and wherein the intermediate or central portion of the patch is provided with means to effectively hold the patch in applied position.

The invention consists in the details of construction and in the combination and arrangement of the several parts of my improved tire patch whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective of a tire patch constructed in accordance with an embodiment of my invention, the associated casing being fragmentarily indicated by broken lines;

Figure 2 is a view in bottom plan of the patch as herein disclosed; and

Figure 3 is a view in cross section of the structure as illustrated in Figure 1, the associated casing being indicated by broken lines.

As disclosed in the accompanying drawings, 1 denotes the body of my improved patch which is preferably made of rubber and fabric with the marginal portions of the body disposed on a bevel as indicated at 2 to provide feather edges. Each end portion of the body 1 at the opposite side thereof is cut away as at 3 on a predetermined incline whereby each extremity of the body constitutes an end flap 4 which, when the patch is applied is loose or free and is adapted to be tightly pressed against the tire casing when the inner tube is inflated and thus protecting the inner tube from damage. Each side marginal portion of the body 1 adjacent each of the end aprons 4 and at equi-distantly spaced points between said aprons has secured thereto, preferably by the rivets 5, the hook members 6, the hook members at one side of the body 1 being adapted to fasten upon the bead at the adjacent side of the casing. The hooks 6 provide means whereby the patch is firmly attached to the casing and are spaced from the edges 2.

The heads of the rivets 5 are preferably disposed inwardly of the body 1 and have disposed thereover a rubber coating 7 whereby the tube is further protected against injury when the patch is applied.

The end flaps 4 by being pressed tightly against the casing serve to prevent the tube from crawling between the patch and the casing and which is particularly assured by the marginal portions of said patch being formed into feather edges.

From the foregoing description it is thought to be obvious that a tire patch constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A tire patch comprising an elongated body of sheet-like formation curved longitudinally and transversely and means near the marginal portions of the body for securing the same with respect to the rim of a wheel, the ends of the body being arranged at an incline whereby to define free end portions constituting flaps.

In testimony whereof I hereunto affix my signature.

ROY DUROSSETTE.